United States Patent [19]

Dierberger

[11] 4,118,146

[45] Oct. 3, 1978

[54] COOLABLE WALL

[75] Inventor: James Albert Dierberger, Hebron, Conn.

[73] Assignee: United Technologies Corporation, Hartford, Conn.

[21] Appl. No.: 713,739

[22] Filed: Aug. 11, 1976

[51] Int. Cl.² ............................................. F01D 5/18
[52] U.S. Cl. .................................. 416/97 A; 415/115
[58] Field of Search .............. 416/96, 96 A, 97, 97 A; 415/115

[56] References Cited

U.S. PATENT DOCUMENTS

| | | |
|---|---|---|
| 3,240,468 | 3/1966 | Watts et al. ............... 416/96 A X |
| 3,584,972 | 6/1971 | Meginnis et al. ................. 416/229 |
| 3,610,769 | 10/1971 | Schwedland ................. 416/97 X |
| 3,628,880 | 12/1971 | Smuland et al. ................. 415/115 |
| 3,644,059 | 2/1972 | Bryan .............................. 416/97 |
| 3,644,060 | 2/1972 | Bryan .............................. 416/97 |
| 3,647,316 | 3/1972 | Moskowitz ..................... 416/97 |
| 3,700,418 | 10/1972 | Mayeda ..................... 416/97 A X |
| 3,726,604 | 4/1973 | Helms et al. ............... 416/97 A X |
| 3,799,696 | 3/1974 | Redman ....................... 416/96 A |
| 3,800,864 | 4/1974 | Hauser et al. ................ 415/115 X |
| 3,806,276 | 4/1974 | Aspinwall ..................... 416/96 A X |
| 3,930,748 | 1/1976 | Redman et al. ................. 416/97 A |
| 4,013,376 | 3/1977 | Bisson et al. ................. 416/181 X |
| 4,022,542 | 5/1977 | Barbeau ........................ 416/97 A |
| 4,040,767 | 8/1977 | Dierberger et al. ........... 416/96 A X |

FOREIGN PATENT DOCUMENTS 1,285,369  8/1972  United Kingdom ............... 416/97 A

*Primary Examiner*—Everette A. Powell, Jr.
*Attorney, Agent, or Firm*—Robert C. Walker

[57] ABSTRACT

A coolable wall element which is adapted for combined impingement and transpiration cooling in environments where the pressure differential across the wall element differs substantially with physical position along the wall is disclosed. Techniques varying the proportion of impingement to transpiration cooling along the wall are developed. The wall element is shown in one embodiment as forming a portion of the wall of an air-foil adapted for use in the turbine section of a gas turbine engine.

2 Claims, 4 Drawing Figures

COOLABLE WALL

BACKGROUND OF THE INVENTION

1. Field of the Invention

This invention relates to coolable wall elements and more specifically to elements combining impingement and transpiration cooling techniques.

2. Description of the Prior Art

A limiting factor in high temperature machinery, such as gas turbine engines, is the maximum temperature of the working medium gases which can be tolerated in the machine without adversely limiting the durability of the individual components. Specifically, within gas turbine engines the rotor blades and the nozzle guide vanes of the turbine are susceptible to thermal damage and are cooled by a variety of techniques. Nearly all known techniques utilize air which is bled from the compressor and flowed to the local area to be cooled through suitable conduit means.

The range of techniques which have been proposed in the past and those which are being proposed today continue to emphasize reduced cooling air consumption and improved cooling effectiveness. Impingement cooling is known to be one of the more effective techniques for efficiently utilizing cooling air. In impingement cooling a high velocity stream of air is directed against the component to be cooled. The high velocity stream impinges upon a surface of the component and increases the rate of heat transfer between the component and the cooling air. A typical application of impingement cooling is discussed by Smuland et al in U.S. Pat. No. 3,628,880 entitled "Vane Assembly and Temperature Control Arrangement". Smuland et al shows baffle plates interposed between the cooling air supply and the component to be cooled. Orifices in each plate direct jets of the cooling air across an intermediate space between the baffle and the cooled component during operation of the engine. The pressure ratio across each plate is sufficiently high to cause the cooling air flowing through the plate to accelerate to velocities at which the flow impinges upon the opposing surface of the component to be cooled. Cooling air is exhausted from the intermediate space between the plate and the opposing surface at a high rate to prevent the buildup of back pressure within the space. In Smuland et al film cooling passageways are utilized to exhaust the impingement flow.

A second highly effective, but not as widely utilized technique, is that of transpiration cooling. A cooling medium is allowed to exude at low velocities through a multiplicity of tiny holes in the wall of the component to be cooled. The low velocity flow adheres to the external surface of the component to isolate the component from the heat source. In transpiration cooling the exuding velocities remain low in order to prevent overpenetration of the working medium gases by the cooling air. Overpenetration prevents adherence of the cooling fluid to the component and interrupts the flow of medium gases. One typical application of transpiration cooling to a turbine vane is discussed by Moskowitz et al in U.S. Pat. No. 3,706,506 entitled "Transpiration Cooled Turbine Blade with Metered Constant Flow". Moskowitz et al shows a plurality of coolant channels formed across the chord of the blade to accommodate both temperature and pressure gradients across the chord. Cooling air is flowed to each channel through a metering plate at the base of the airfoil section. A preferred pressure ratio across the cooled wall in most transpiration cooled embodiments is approximately 1.25. The effectiveness of the transpiration cooled construction is highly sensitive to variations from the design pressure ratio across the surface to be cooled; accordingly, the pressure ratio must be closely controlled. Impingement and transpiration cooling are incorporated in one airfoil section in U.S. Pat. No. 3,726,604 to Helms et al entitled "Cooled Jet Flap". The impingement cooling is applied to the leading edge of the airfoil section and transpiration cooling is applied to the suction and pressure walls; however, both cooling techniques are not applied simultaneously to supplement each other in cooling a common portion of the vane wall.

The above-described individual cooling techniques, have been successful in prolonging the life of various machine components. A requirement for even more durable, high performance machinery, however, exists. More effective techniques for cooling with lesser quantities of air are continually being sought.

SUMMARY OF THE INVENTION

A primary aim of the present invention is to provide a coolable wall element for use in high temperature machinery. The judicious allocation of the cooling medium to effect the desired temperature control in a geometrically adaptable wall structure is a concurrent goal. In one embodiment a specific object is to effectively vary the proportion of impingement and transpiration cooling as a function of the pressure differential across the wall.

According to the present invention, transpiration and impingement cooling techniques are combined in a coolable wall element having a plurality of chambers formed between a first plate which opposes the predominant heat source during use and has a plurality of transpiration holes disposed therein, and a second plate which opposes the cooling medium supply during use and has a plurality of impingement orifices disposed therein, the ratio of the total area of the transpiration holes leading from each chamber to the total area of the impingement orifices leading to the respective chamber being a function of the pressure ratio across the wall element as related by the FIG. 4 curve.

Primary features of the invention include the transpiration holes in the first plate and the impingement orifices in the second plate. The orifices of the second plate accelerate the cooling medium flowing therethrough in use to velocities which are sufficient to forcefully direct the medium across the chamber and cause the medium to impinge upon the first plate. The holes of the first plate direct the cooling medium through the plate at velocities which are sufficiently low to enable the exuding cooling medium to adhere proximately to the first plate. The holes of the first plate and the orifices of the second plate are communicatively joined by a plurality of adjacent chambers. The ratio of the total flow area of the transpiration holes leading from each chamber to the impingement orifices leading to each chamber is functionally related to the pressure ratio across the wall as shown by the FIG. 4 curve.

A principal advantage of the present invention is effective cooling as provided by the combination of transpiration and impingement cooling techniques. The geometric adaptability of the cooling structure to the physical requirements in a wide range of machinery applications is a further advantage. Cooling air is judiciously utilized in the structure for a high degree of cooling effectiveness as the balance between impingement cooling and transpiration cooling is varied according to the expected local pressure ratio across the wall.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
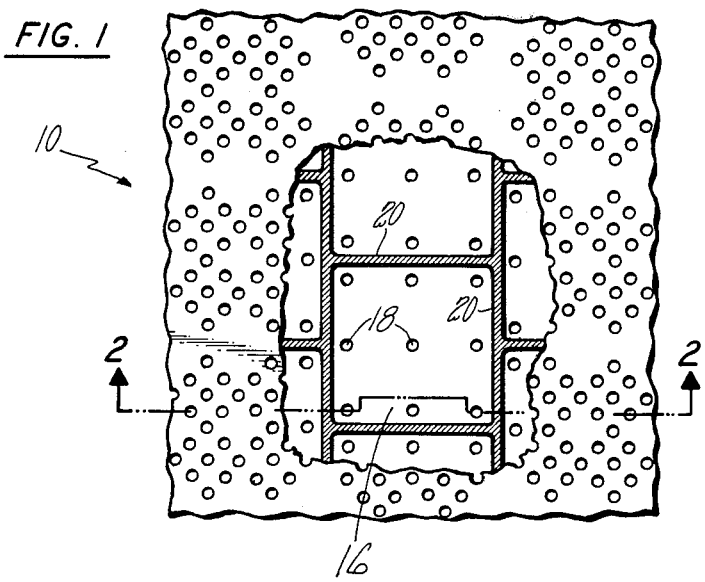
FIG. 1 is a view of a coolable wall element including a portion broken away to reveal a plurality of chambers contained within the wall element.

An embodiment of the coolable wall element of the present invention is shown in FIG. 1. The wall element 10 is formed of a first plate member 12 which is penetrated by a multiplicity of transpiration holes 14 and a second plate member 16 which is penetrated by a multiplicity of impingement orifices 18. The first and second plate members are separated by dividing means such as the integrally formed ribs 20 which extend from the first plate member as is also viewable in FIG. 2. The ribs 20 collaterally form a plurality of chambers 22 between the plates.

In use the second plate opposes a cooling air supply means and the first plate opposes the predominant heat source. The wall element is adapted for the flow of cooling air thereacross from the orifices of the second plate, across the chambers and through the holes of the first plate. The orifices of the second plate are sized so as to be capable of accelerating cooling air from the supply means during use to a velocity which is sufficient to cause the air flowing therethrough to be directed across the respective chamber and into impingement against the opposing first plate. The holes of the first plate are sized so as to be capable of flowing air from the respective chamber during use across the first wall at velocities which are sufficiently low so as to cause the exuding flow to adhere proximately to the first plate. The precise sizing of the holes and orifices to individually effect transpiration and impingement cooling as described in the Prior Art section of this specification is dependent principally upon the pressure differential across the respective plate member and the spacing between the plate members. Impingement cooling and transpiration cooling are individually known techniques and the sizing requirements necessary to accomplish these functions are, accordingly, not part of the inventive concepts taught herein.

The most effective combination of impingement and transpiration cooling techniques in a single embodiment as taught by this specification is critically dependent upon the ratio $(A_T/A_I)$ of the total flow area $(A_T)$ through the transpiration holes 14 to the total flow area $(A_I)$ through the impingement orifices 18. Furthermore, this critical ratio varies according to the pressure ratio $(P_S/P_D)$, where $(P_S)$ is the supply pressure to the impingement orifices and $(P_D)$ is the discharge pressure to which flow is exuded from the transpiration holes. Analytical evaluation and interpretation of empirical test data has produced the FIG. 4 curve relating area ratio to pressure ratio.

Varying the area ratio $(A_T/A_I)$ alters the proportion of impingement cooling to transpiration cooling. At low pressure ratios $(P_S/P_D)$ it can be seen from the FIG. 4 curve that a high proportion of transpiration cooling to impingement cooling is desired. Transpiration cooling in this environment offers the maximum utilization of a minimum of cooling air to effect adequate cooling. For example, the preferred area ratio $(A_T/A_I)$ for a pressure ratio of 1.02 is approximately 0.5.

Figure 4:
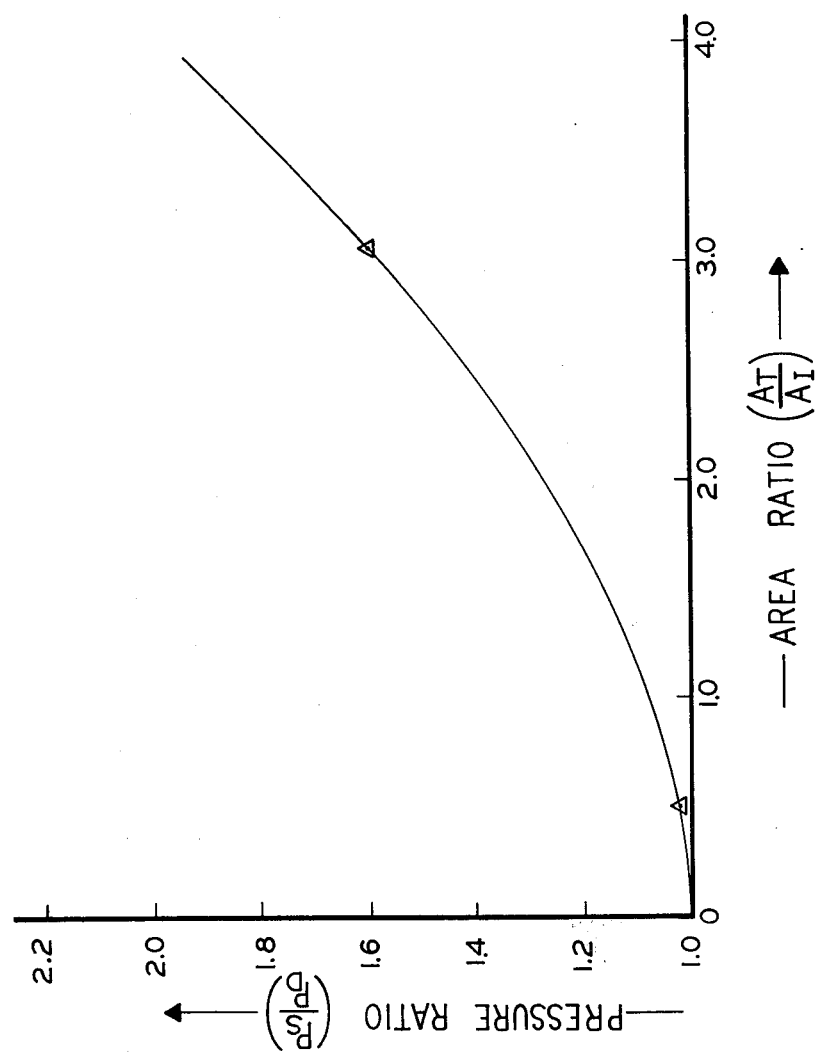
FIG. 4 is a curve relating the preferred area ratio between the supply orifices to each chamber and discharge holes from each chamber as a function of the pressure ratio across the wall element.

Correspondingly, at high pressure ratios $(P_S/P_D)$ it can be seen from the FIG. 4 curve that a high proportion of impingement cooling to transpiration cooling is desired. Impingement cooling in this environment offers the maximum utilization of a minimum of cooling air to effect adequate cooling. For example, the preferred area ratio $(A_T/A_I)$ for a pressure ratio $(P_S/P_D)$ of 1.6 is approximately 3.05. Of course, those skilled in the art will recognize that area ratios proximate to those explicitly taught by the FIG. 4 curve will produce correspondingly proximate cooling.

In the embodiments shown the inventive concepts described herein are adapted to a coolable wall element for use in an environment imposing a pressure differential across the wall which varies with physical location along the wall. The plurality of chambers, as shown in FIG. 1, enables variation in the area ratio $(A_T/A_I)$ with wall location by isolating flow across the wall into controllable regions.

Figure 2:
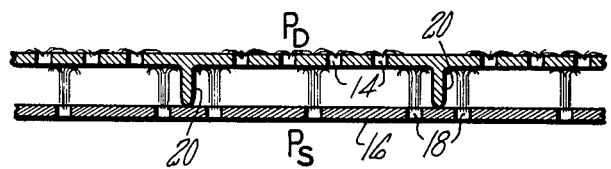
FIG. 2 is a sectional view taken along the line 2—2 of FIG. 1.
Figure 3:
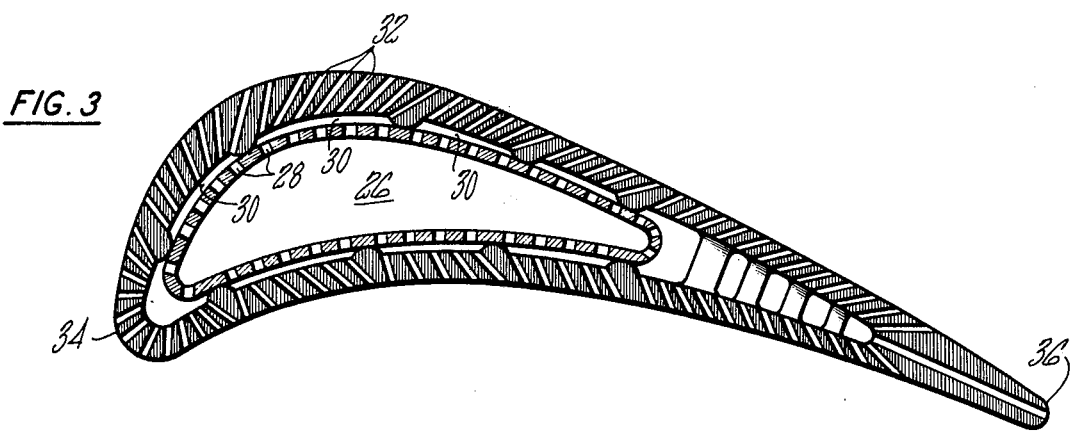
FIG. 3 is a sectional view taken through an airfoil of a gas turbine engine showing the coolable wall element as adapted for use in the airfoil.

The wall element shown in FIGS. 1 and 2 is geometrically adaptable to a wide range of machinery components. The airfoil 24, which is shown in cross section in FIG. 3, is but one illustration of a component to which the coolable wall element is adaptable. Cooling air is flowable to the interior cavity 26 of the airfoil at a supply pressure $(P_S)$ and is dischargeable through the impingement orifices 28, across the chambers 30, and through the transpiration holes 32 to a discharge pressure $(P_D)$ which decreases dramatically along the airfoil wall from the leading edge 34 to the trailing edge 36 of the airfoil. The plurality of chambers shown isolate local regions of the coolable wall to enable variations in the area ratio $(A_T/A_I)$ in accordance with the FIG. 4 curve. Similar adaptations of the present invention to airfoil platforms and flow path walls in a gas turbine engine are within the scope of the concepts taught in this specification as are other comparable structures.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a coolable wall element of the type formed of:
   a first plate member having a plurality of transpiration holes extending therethrough;
   a second plate member spaced from said first plate member and having a plurality of impingement orifices extending therethrough; and a plurality of ribs extending between said first and second plates to form a plurality of chambers therebetween wherein cooling air is flowable to each chamber through a plurality of said impingement orifices having a total area ($A_I$) and from each chamber through a plurality of said transpiration holes having a total area ($A_T$); and of the type wherein said wall element is adapted for combined impingement and transpiration cooling at a pressure ratio ($P_S$)/($P_D$) across the wall element which differs substantially with physical position along the wall element, $P_S$ being the supply pressure of cooling air to each chamber and $P_D$ being the pressure to which cooling air is discharged from each chamber, the improvement comprising:

transpiration holes and impingement orifices sized such that the ratio ($A_T/A_I$) of the total area of the transpiration holes from each of said chambers to the total area of the impingement orifices to each of said chambers is related to the ratio ($P_S/P_D$) of the supply pressure to the discharge pressure across that chamber by the curve shown in FIG. 4.

2. The invention according to claim 1 wherein said wall element is contoured to form at least a portion of the wall of an airfoil of the type utilized in gas turbine engines.

* * * * *